NOISE MODULATION CONTROL SYSTEM
Filed May 17, 1962 6 Sheets-Sheet 1
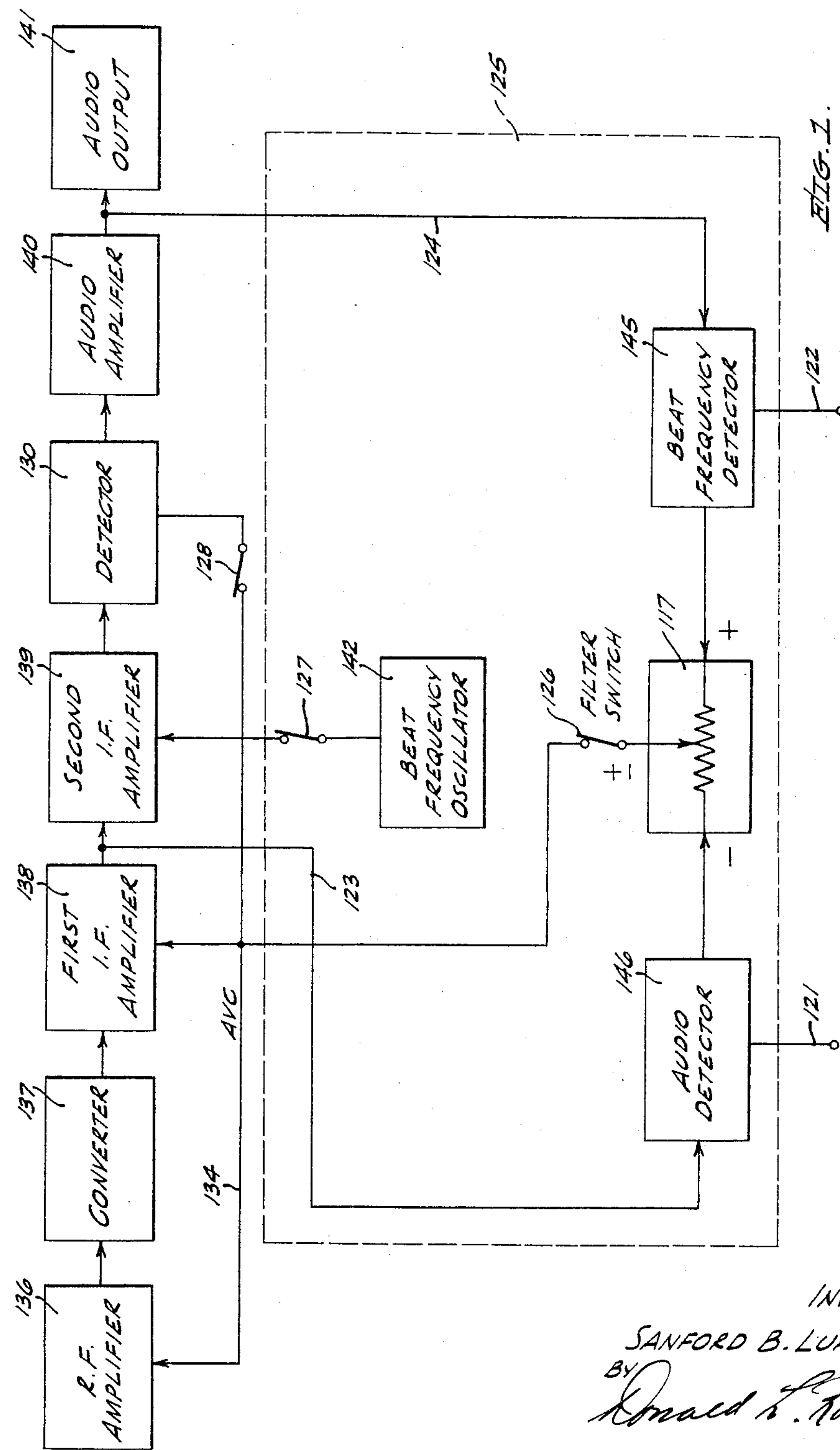
INVENTOR
SANFORD B. LUFTIG,
BY Donald L. Royer Sept. 27, 1966 S. B. LUFTIG 3,275,939
NOISE MODULATION CONTROL SYSTEM
Filed May 17, 1962 6 Sheets-Sheet 2
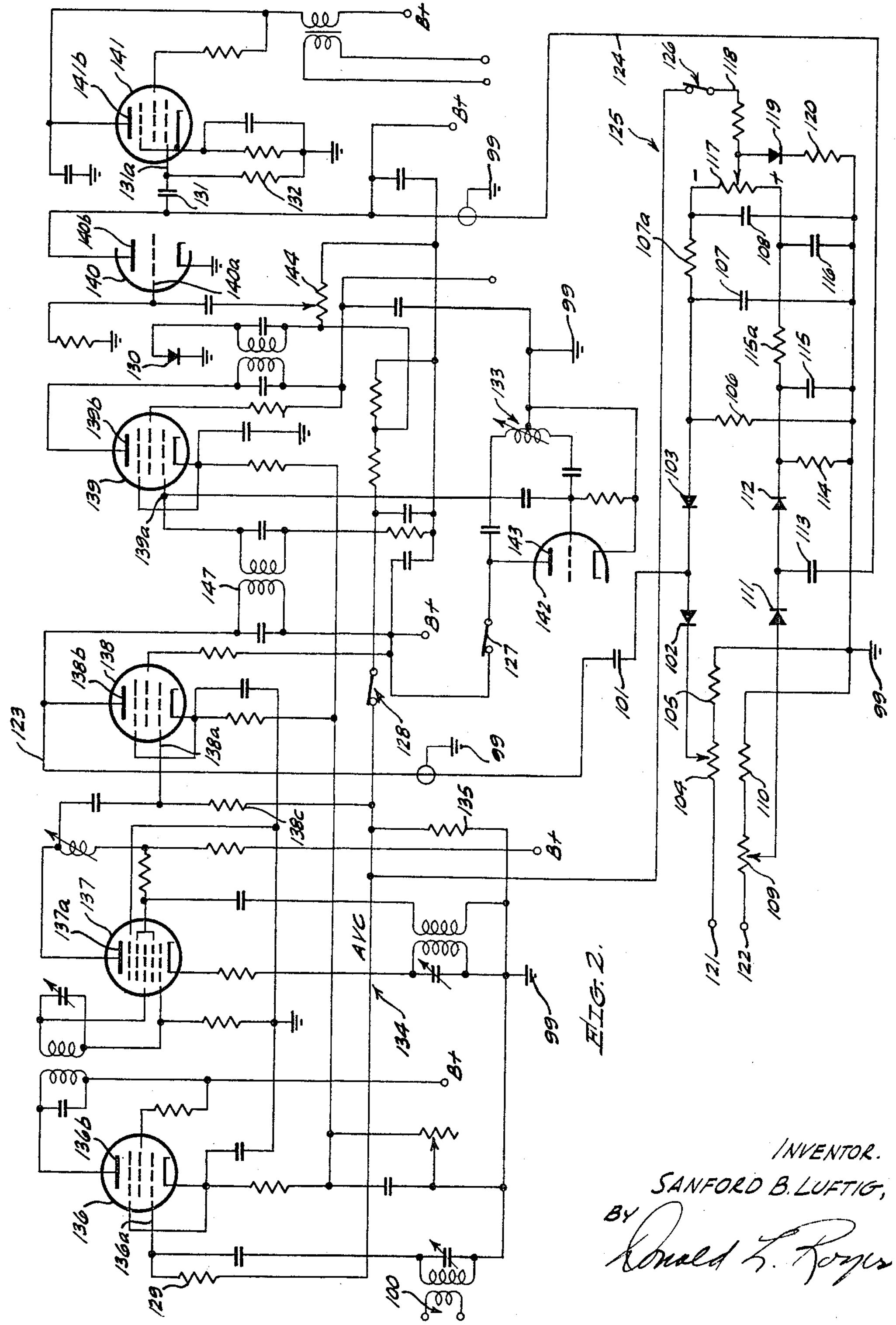
INVENTOR.
SANFORD B. LUFTIG,
BY Donald L. Rogers

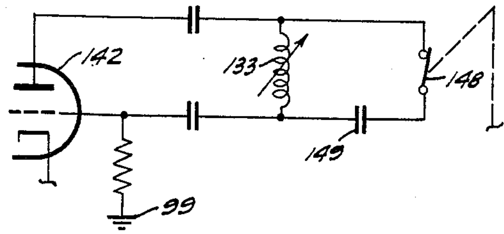
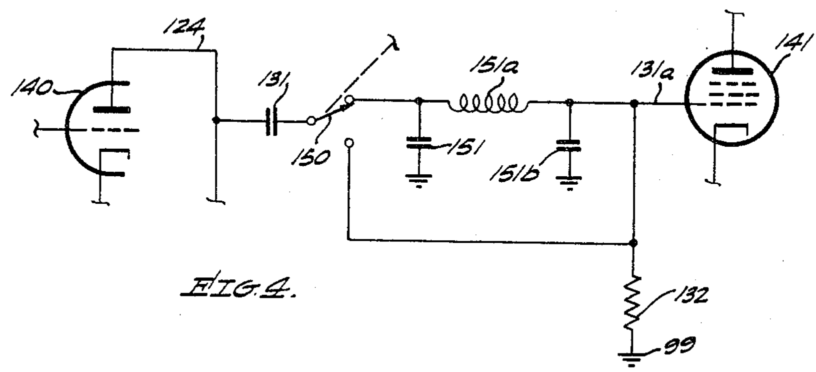
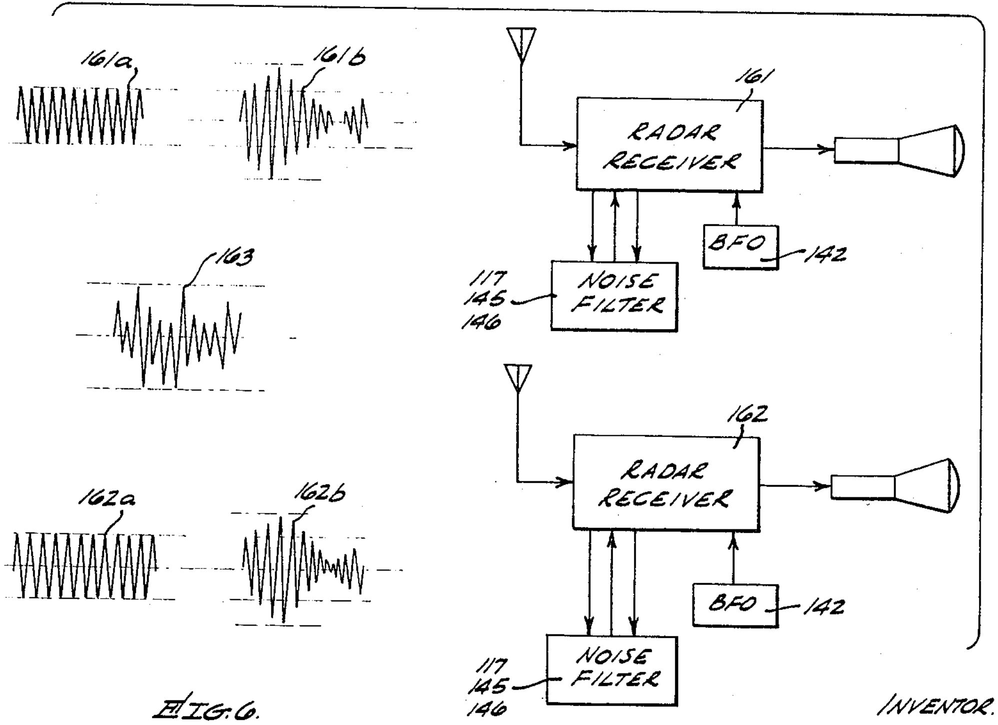
INVENTOR.
SANFORD B. LUFTIG,
BY Donald L. Royer

NOISE MODULATION CONTROL SYSTEM
Filed May 17, 1962
6 Sheets-Sheet 4
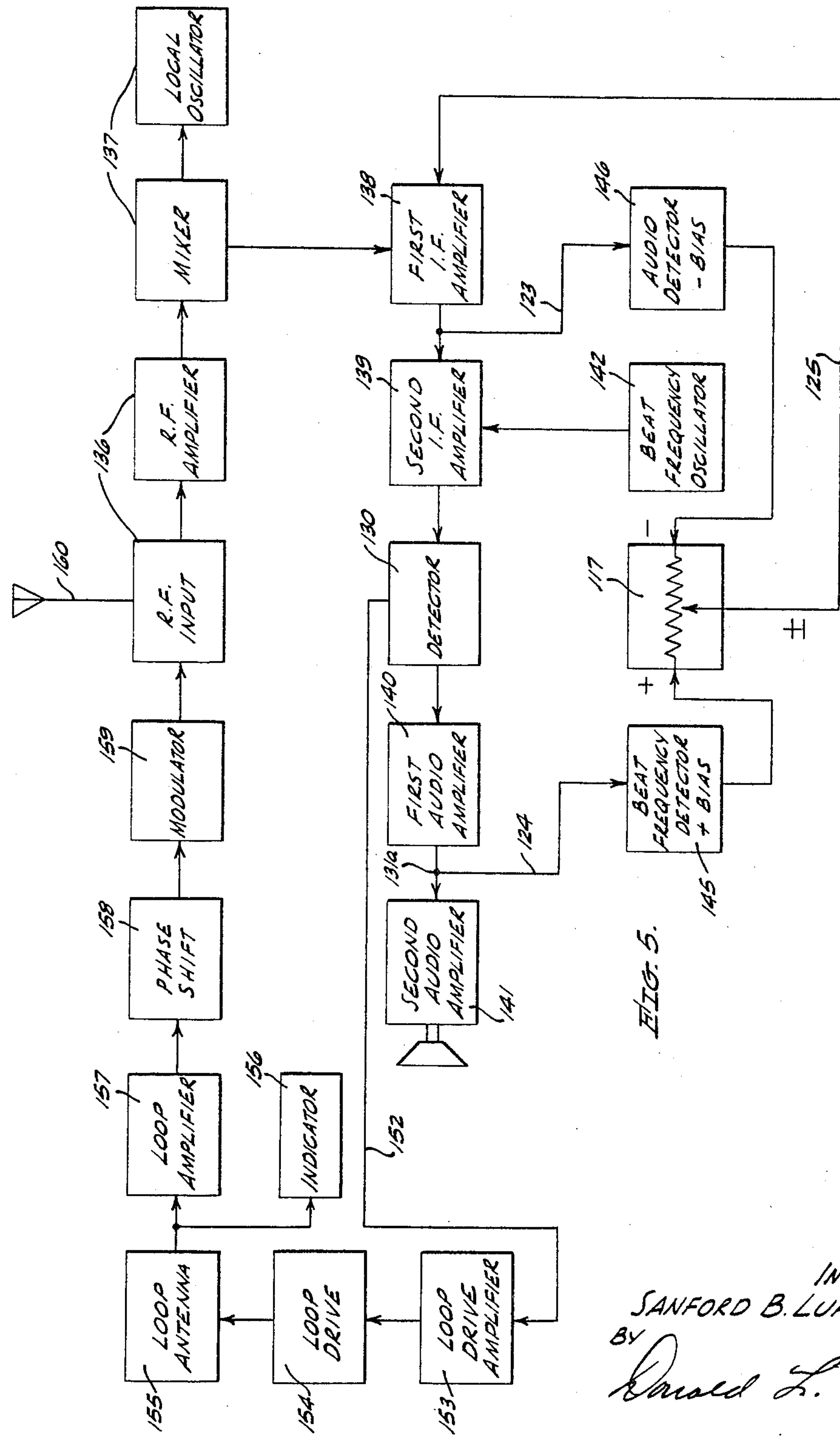
INVENTOR.
SANFORD B. LUFTIG,
BY
Donald L. Royer NOISE MODULATION CONTROL SYSTEM
Filed May 17, 1962 6 Sheets-Sheet 5
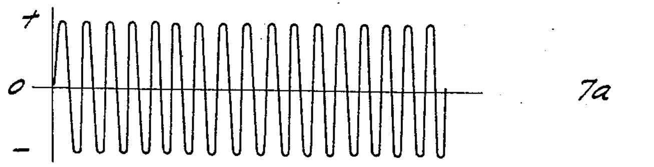
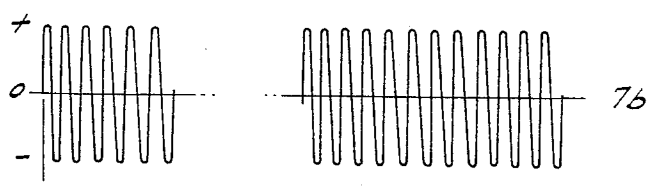
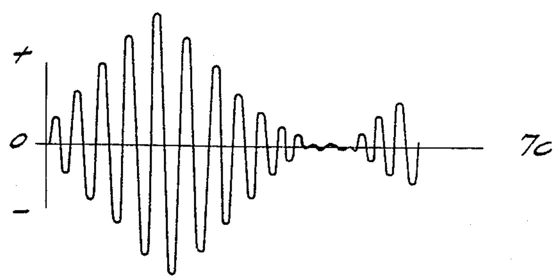
FIG. 7.
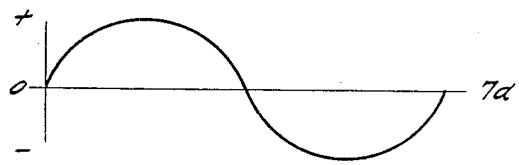
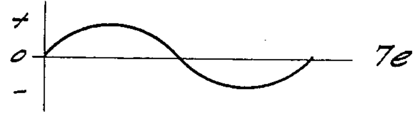
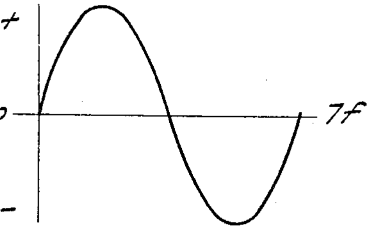
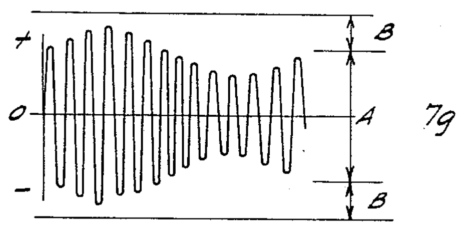
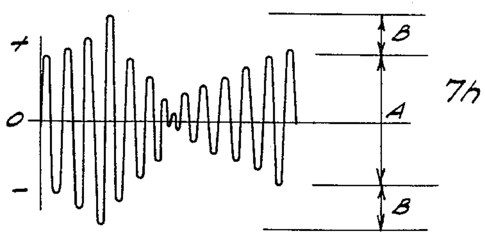
INVENTOR.
SANFORD B. LUFTIG,
BY Donald L. Roper

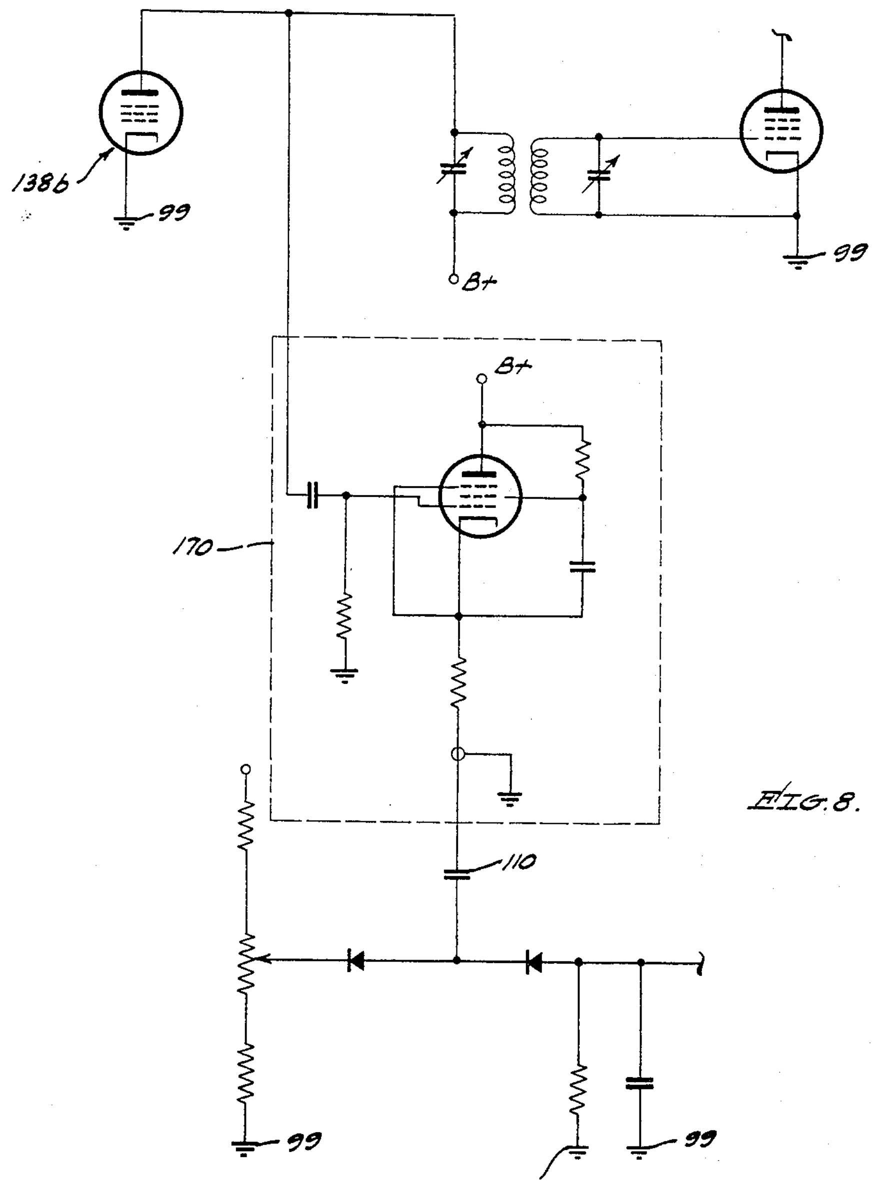
INVENTOR.
SANFORD B. LUFTIG,
BY Donald L. Royer

United States Patent Office 3,275,939
Patented Sept. 27, 1966

3,275,939

NOISE MODULATION CONTROL SYSTEM

Sanford B. Luftig, Wichita, Kans., assignor of thirty-seven and one-half percent to The Wheeler Kelly & Hagny Investment Company, Wichita, Kans., and ten and one-half percent to Walter P. Innes, Jr., and nine percent each to Walter P. Innes III, William D. Innes, and Betty S. Innes, all of Eastborough, Kans.

Filed May 17, 1962, Ser. No. 195,493
15 Claims. (Cl. 325—399)

This invention relates to systems and apparatus for the elimination of noise in a communications system and relates more particularly to such systems and apparatus for controlling amplitude modulated carrier signals in a manner to provide a more efficient use of the transmission frequency spectrum, while allowing a large savings in cost, weight and volume of transmission equipment.

The purpose of a communication system is to transmit information. A complete system includes a transmitter, a transmission channel over which the information is transmitted, and a receiver to recover the information. The transmission channel may be a pair of wires, a wave guide, or the atmosphere as used for radio transmission. Usually undesired disturbances, commonly called noises, are added to the transmitted signal in the channel and in the early stages of the receiver. Unfortunately, the signal voltage in the transmission channel is likely to be very small, and the noise voltage, although quite small, may be of the same order of magnitude as the signal. Consequently, the recovery of the transmitted signal by the receiver may be difficult, and the problem of separating the information from the undesired disturbances exists. The noise control apparatus to be described hereinafter is applicable to various types of communication systems; however, for purposes of describing the invention, it will be discussed as applied to an amplitude modulation radio communications system.

The present system and apparatus is of particular advantage in providing for increased use of the low and medium frequency (*L/MF*) radio spectrum which is inherently more subject to deterioration by radio noise, such as that generated by atmospheric conditions and man-made interference. This invention provides the desired improvement in reception through use of a novel and improved circuit within the radio receiver forming a portion of an over-all communication system.

The majority of contemporary and heretofore known radio communication systems employ amplitude modulation of the radio carrier. Amplitude modulation is the process by which the amplitude of a high-frequency carrier is made to vary as a function of the instantaneous value of a message to be transmitted. In the simples case, information is transmitted by keying the carrier on and off; thus, it is at either zero or at a given maximum amplitude. The amplitude modulated signal is transmitted to a radio receiver wherein it is detected and transformed to the characteristics desired for audible, visual, or other informational use by an operator. Noise introduced into an amplitude modulation (AM) radio transmission system varies both in frequency and amplitude. This noise is impressed on the transmission channel causing additional modulation of the amplitude of the transmitted carrier. For the purposes of the present discussion, all amplitude modulation of a radio carrier, whether noise or intelligence, may be considered one and the same. In contemporary systems, such as airways navigation and communication, commercial communications and radio direction finding systems, intelligence to be transmitted and received by a radio receiver is combined and added to the radio carrier at the transmitter. The accepted penalty in cost, weight and volume of providing intelligence in this manner is approximately half of the over-all transmitter cost, weight and volume. Additionally, substantially all of the interference impressed on the modulation envelope, in an amplitude modulated system, is in the form of amplitude modulation received at the input of a radio receiver. Many well-known methods are employed in a manner to reduce the over-all amplitude of the noise modulated carrier, limit the percentage of modulation, or to cut off the receiver during the time period in which the noise pulse occurs. A majority of these prior systems consist of audio noise limiters or intermediate frequency (IF) stage noise silencers. The effectiveness of either of these prior systems and methods of filtering is dependent upon the amount of modulation, or intelligence, to which the carrier may be restricted without excessive deterioration of desired information. Additionally, in the IF stage noise silencer method, the time period of the noise pulse is restricted at that stage in the radio receiver. This type of noise filter is frequency dependent, that is to say, characteristically it must be resonant at the IF frequency of the individual receiver.

One particular type of such system is commonly known as the "Lamb IF Noise Silencer" and is typical of the systems employed in contemporary receivers. In such systems, an IF resonant circuit is coupled to the IF stage; a signal is derived from this resonant circuit amplified, demodulated and applied as a negative bias voltage to a "controlled IF stage," which is cut off or gated during noise pulse time-periods. The effectiveness of this type of circuit is directly related to the time-duration, amplitude, shape and frequency of the noise pulses. Characteristically, a circuit of this nature must be employed at the most non-selective IF stage, in an effort to produce a short noise pulse time as related to an over-all passband of an IF curve. Three to six vacuum tubes or transistor stages, are commonly used to implement the "Lamb" type circuit. The problems inherent in such prior systems reside in the fact that recovery time of a radio receiver controlled by noise silencer circuits is limited by the time constants inherent in the controlled circuits or stages. No effective method or system is presently known to overcome this problem.

In the case of "display" type radio receivers, such as radio direction finders, or more specifically, automatic direction finder (ADF) airborne radio receivers, atmospheric noise is an inherent problem limiting the usefulness of the device. It is well-known that the loop antenna of an ADF receiver will seek a homing signal which is a result of, and directly proportional to, the vector sums of the amplitude and bearing of all radio frequency signals, or noise signals, within the resonant frequency range of the receiver center frequency. Additionally, the ADF receiver loop antenna and circuitry only uses a radio frequency carrier signal continuous wave or interrupted continuous wave (CW or ICW) for bearing information. Modulation, in the form of approximately 300 to 1000 cycles per second audio is added to the radio frequency carrier for purposes of station identification. When 1000 c.p.s. modulation is added to the radio frequency carrier, certain radio frequency spectrum requirements must be allowed; e.g., two times the highest modulation frequency on either side of the center frequency, or 4 kilocycles, plus an allowance for adjacent channel interference. The accepted channel separation is in the order of more than 10 kilocycles per station, or a separation of approximately 20 kilocycles between adjacent channels in the same (radio) geographical area. The aircraft radio navigational band (*L/MF*) has a width of from 200 to 400 kilocycles. A maximum of 10 stations is thus allowable in one (radio) geographical area.

In all amplitude modulated CW or ICW radio frequency signals, the foregoing description is valid. In the case of voice modulated radio frequency signals, the modulating frequency range is typically 200 to 2500 c.p.s. since it may be restricted to such range without significant loss of intelligence. Suppressed carrier or single sideband characteristics may be defined, for the purposes of this description, as voice modulated ICW radio frequency signals. Two unmodulated CW or ICW radio frequency signals, which intentionally or unintentionally, are located frequency-wise or geographically in a manner to cause a difference frequency (audio or radio frequency), create an undesired beat note between the two signals at a radio frequency receiver input stage, and may be considered as amplitude modulated CW or ICW radio frequency signals.

Noise filters of the types previously described may be included as an integral component of radio receivers. They may also be retrofitted, as an independent unit, to existing radio receivers with minor modifications to said receivers. In either case, the noise filter does not eliminate 100 percent of the audio component of the overall waveform. Complete compatibility of prior filters for various types of AM emissions, such as A0, A1, A2 and A3, is not achieved.

For eliminating the undesirable effects of noise in a communication system, a typical embodiment of the present invention, as applied to an AM radio transmission system, employs means for detecting all modulation on the carrier to provide a first direct current (D.C.) signal voltage; the carrier is then combined with the output of a local oscillator to provide a beat frequency which is detected to provide a relatively constant second D.C. signal voltage having a polarity opposite that of the first signal voltage; the first and second signal voltages are mixed in a summing network and the output applied as a control signal to the automatic volume control (AVC) circuit of the receiver for the purpose of suppression of noise modulation appearing on the received carrier. In this way, the receiver is cut off during periods of noise modulation of the carrier. Various modes of operation, as applied to both CW and voice-modulated carriers, will be described hereinafter.

It is, therefore, a principal object of the invention to provide novel and improved means for controlling noise modulation in a communications system.

It is another important object of the present invention to provide a communications system, having output characteristics resulting in freedom from atmospheric and man-made interference, which is not frequency-dependent and is compatible with various types of amplitude modulated emissions.

A further object of the invention is to provide a radio transmitting and receiving system which conserves space in the radio spectrum, by eliminating unwanted or unnecessary modulation of the radio frequency carrier signal, while providing all required intelligence at a receiver output and end display, or to receiver operator, in a compatible manner and identical with, the individual communications systems.

Another important object of the present invention is to provide a novel and improved radio noise filter which is not frequency dependent and is compatible with, and adapted for use in, existing radio receivers, such filter being suitable for retrofitting to existing radio receivers whether of the ICW, voice or display types, and compatible with all known receivers without change in filter design or construction.

Still another object of the invention is to provide a noise filter of improved characteristics, which is reliable, efficient and inexpensive and of less cubic volume than heretofore known devices that have been intended or proposed for similar purposes.

Another object of the invention is to provide a radio transmission and receiving system which permits use of narrow-band front end and IF stage radio receiver design in communications fields which now commonly use wide-band front end and IF stage receiver design to permit acceptance of audio modulation frequencies, thereby to improve the inherent signal-to-noise ratio of the radio receiver.

A further object of the invention is to provide modulation intelligence, in the form of an audio tone generated within the radio receiver, to an unmodulated radio frequency carrier signal when said signal is transmitted in type A1 or A2 emission.

Another object of this invention is to provide all objectives described to all known forms of emission and above or below the surface of land or water.

A general object of this invention is to provide new and improved noise modulation control apparatus which overcomes disadvantages of previous means and methods heretofore intended to accomplish generally similar purposes.

The system and apparatus of the present invention also finds particular utility in the filtering of intentional or unintentional modulation interference created in radar receivers due to the frequency of, or geographical proximity to, interfering radar frequency transmitters. Such interference is common at large commercial airports where many radar systems are simultaneously operated in close proximity. Modulation of the transmitted radar pulse of the one transmitter occurs when direct or spurious radiation from a second radar transmitter beats with the original pulse and creates a difference frequency causing reflected power gains that overload the radar receiver or output display. This situation can also occur under conditions of reception of unwanted target reflections within the passband of the radar receiver.

The present invention also provides a beat frequency oscillator (BFO) function within the radio receiver(s) previously described. In the event no BFO is contained within the receiver, the function thereof may be provided as an integral part of the present invention. The BFO output may also be limited to a maximum frequency of the order of 2500 c.p.s., which, when provided in combination with a low pass filter, allows the reception of voice modulation frequencies and audio intelligence within this restricted frequency range. Means are also provided for switching the low-pass filter in or out of the circuit to provide CW or ICW as well as voice mode reception within the receiver as desired.

The inherent atmospheric and man-made noise effects associated with the radio spectrum from the VLF through VHF range (3 kc. through 300 mc.), result in unwanted amplitude modulation of a radio frequency carrier in the form of a vectorial addition. The effective power gain contained in such amplitude modulation of the carrier waveform provides many ill effects ranging from an annoyance factor in the radio receiver output to complete masking of the intelligence contained in the transmitted signal. The apparatus and method of eliminating this undesired noise effect, as described herein, has been successfully applied in both fixed and mobile communications systems.

By eliminating 100 percent of the amplitude modulation from a transmitted radio carrier, an effective 100 percent reduction in amplitude modulation noise effect on a CW or ICW mode signal is accomplished. Detection of negative-going modulation pulses is made at the output of an IF stage in the receiver, prior to the point of any BFO voltage injection. Demodulation of the negative-going voltage, which varies directly with the average amplitude of the modulation pulses to this point, is made and filtered. The resultant varying D.C. voltage is filtered and applied to one end of a variable resistance, a tap of which is connected to an automatic volume control (AVC) bus of the receiver. During the time-period of modulation pulses, the RF and prior IF stage or stages are cut off. If this cut-off bias voltage was permitted to decay in the normal manner, the affected stages would remain in this cut-off condition for an undesirably long period of time, relative to the amplitude and time-duration of the modulation pulse amplitude. The normal long time constants of the receiver AVC circuitry would thus prevent a rapid recovery time, and only afford such recovery when the amplitude and pulse repetition rate was sufficiently low to permit discharge of associated grid circuit capacitors. Capacitor discharge rate is fast, early in the discharge period, and essentially linear during this time. During the later discharge period, voltage decay is non-linear and greatly lengthened, relative to a time base, to a point incompatible with large pulse amplitudes and fast repetition rates. The present system and circuit substantially decreases the long time constant effect on the cut-off period of the receiver stage or stages.

For a better understanding of the invention, and as one specific example, assume that the cut-off control grid voltage of the above referenced stages is of the order of −2.0 volts. Further assume that a negative-going bias voltage is developed from the modulation components, which drives the control grids to −4.0 volts. The linear fast decay time period reduces the grid bias to approximately −1.9 volts. At this time, a low-amplitude, but usable signal, at the IF frequency is amplified and reaches the point of BFO injection. A resultant ± difference frequency voltage is developed which is essentially proportional to the amplitude of the BFO injection voltage. At the plate of the first audio amplifier stage, after the point of the normal receiver second detector, the positive-going resultant modulation voltage is demodulated, filtered and applied to the opposite end of the variable resistance, the tap of which is connected to the AVC bus. A varying D.C. bias voltage will thereby exist across the variable resistance which varies proportionally (in a negative direction) to the modulation envelope at the receiver input stage, and in a less negative (positive-going) direction proportionally to the BFO difference frequency voltage. At the time the BFO voltage is applied across the variable resistance the RF and IF controlled stages grid bias must be positive with respect to—2.0 volts (the cut-off voltage). At this point, the capacitor discharge rate is entering the non-linear portion of the over-all curve. The "positive with respect to −2.0 volts" bias output from the variable resistance tap is applied to the control grids and the stages are driven out of the near cut-off bias region, essentially instantaneously with respect to the normal time constant capacitor discharge time.

In the output stage of the receiver, there appears a CW or ICW signal modulated at the BFO difference output frequency, substantially free from any other modulation frequencies. The ± bias levels are made compatible with various receivers by means of the variable resistance.

In the case of voice modulation, the radio receiver is restricted to a given maximum response such as 2500 c.p.s., filtering means being employed to pass only the frequencies between 100 and 2500 c.p.s. between the plate of the first audio stage and the grid of the output stage. The BFO output frequency is limited on the low-frequency side to 2500 c.p.s. to restrict the BFO output from appearing in the output stage of the receiver. That portion of the noise modulation appearing at the input stage of the radio receiver, within the 100 and 2500 c.p.s. audio range will appear in the receiver output. In practice, this has been proven to be less than 20 percent of the amplitude appearing without filtering. Normally, installed noise filters of the type described hereinbefore in connection with the prior art, can be usefully employed in conjunction with the present invention in the voice mode for IF silencing or audio limiting. A distinct advantage is apparent when these filters are used in this combination as the over-all frequency response, subject to noise filtering is limited, but the amplitude of the noise pulses is not.

Other and important features and advantages of the present invention will become apparent from the disclosures in the following detailed specification, appended claims and accompanying drawings, wherein:

FIGURE 1 is a block diagram illustrating the method of connecting the present noise filter into a conventional communications receiver;

FIGURE 2 is a detailed schematic diagram illustrating the noise filter circuit of the present invention in combination with a conventional communications receiver;

FIGURE 3 is a schematic diagram detailing the circuit and method of using a beat frequency oscillator in a voice mode communications receiver;

FIGURE 4 is a schematic diagram of an audio low-pass filter and illustrating the method of insertion in FIGURE 2, to permit use of the communications receiver, in combination with the noise filter, in the voice mode;

FIGURE 5 is a block diagram illustrating the method of connecting the present filter in combination with a conventional automatic direction finder (ADF) receiver;

FIGURE 6 is a combination block and waveform diagram illustrating a pair of radar receivers and application of the noise filter circuit, in combination with these radar receivers, to eliminate the resultant modulation of one radar pulse by another interfering radar transmitter pulse;

FIGURES *7a* through *7h* illustrates the various waveforms encountered herein; and FIGURE 8 is a schematic diagram of a method of providing a cathode follower circuit as a means of isolation between a receiver IF stage and the noise filter and coupling into VHF IF stages.

With reference to the drawings, and with reference primarily to the block diagram of FIGURE 1, it is to be noted that the noise filter of the present invention may be used with a receiver either as an integral portion thereof or an an attachment thereto. To facilitate describing the noise modulation control apparatus of the invention, the basic circuit will be referred to hereinafter as a filter or a noise filter. It should be understood, however, that these terms are used broadly and should not be construed in a limiting sense as sometimes applied to transmission networks comprised of essentially linear elements for the selective attenuation of undesired frequency components. For purposes of the present description, the noise filter will be described and illustrated as an attachment to a typical receiver. In this instance, the noise filter is diagrammatically illustrated at 125 and includes a local oscillator commonly known as a BFO 142. In this connection, it is to be understood that, in those types of receivers having a built-in BFO, the filter 125 would include only a switch 127 to disable the BFO. This switch may be ganged with a filter switch 126, if desired. The BFO 142 may be of the fixed-frequency type, or may have means for selecting a desired frequency, as will be apparent to those skilled in the art.

The typical receiver includes amplifier stages including amplifier 136 coupled to a converter 137 which is, in turn, connected to a first IF amplifier stage 138. A second IF amplifier stage 139 is provided to complete the IF strip and is coupled to a detector 130, the output from which is connected to a detector output amplification stage in the form of two stages of audio amplification indicated at 140 and 141, respectively. The second audio stage 141 may include some type of utilization device such as a loud speaker.

The noise filter 125 includes generally a first rectifier circuit which is defined as an audio detector 146 and a further second rectifier circuit defined as a beat frequency detector 145. The detector 146 input is connected between the IF stages 138 and 139, while the detector 145 has an input connected between the audio stages 140 and 141. The outputs of the detectors 145 and 146 are coupled to opposite ends of a potentiometer 117, an arm of which is connected to an amplification control means such as AVC line 134 of the receiver. The detector 146 applies a negative voltage to the potentiometer 117 and the detector 145 applies a positive voltage to the potentiometer 117, with the potentiometer 117 acting as a voltage summing network, the output of which may be used to control AVC action in the receiver. Details related to the manner by which this action is accomplished will be presented hereinafter.

With reference to FIGURE 2 and the waveforms of FIGURE 7, it is to be noted in FIGURE 2 that components of a conventional communications receiver are illustrated, and for clarity, include only those components used in connection with the description of the present invention. Such commonly included components as screen grid bypass capacitors and the like have been omitted while various other components are merely shown for reference and not specifically identified since their functioning is well-known to those versed in the art.

For an understanding of the invention, any signal flow description must necessarily start with the output of a radio transmitter and, for this particular example, it is assumed that such output is type A1 emission producing a waveform similar to that of FIGURE *7b* and having a given amplitude. An unmodulated carrier (A $\phi$ emission) is shown in FIGURE *7a*. Amplitude modulation interference that may originate from atmospheric or man-made noise, is impressed on or beat against, the signal represented by the waveform of FIGURE *7b* and results is a vectorial addition of the waveforms represented in FIGURES *7b* and *7d*, to produce the resultant composite waveform as represented in FIGURE *7c*.

As shown in FIGURE 2, the receiver has an input 100 and the composite waveform signal, as represented by the illustration in FIGURE *7c*, is inductively coupled into a control grid **136*a* of an RF amplifier tube 136. In this connection, it is to be noted that the various tubes in the receiver are related by common reference numerals to the stages illustrated in the block diagram of FIGURE 1 and elsewhere in the drawings. As it is well-known, the composite waveform is amplified within the tube 136 and appears at the plate 136*b* from which point it is inductively coupled into a converter tube 137. Within the converter tube, the waveform is mixed with an internally generated signal and appears at the plate 137*a* of the converter tube at an IF frequency for which the circuit is designed. The signal is then capacitively coupled into the control grid 138*a* of a first IF tube 138, amplified and appears at plate 138*b*. At this point, a portion of the composite waveform is capacitively coupled through a low reactance (at the lowest audio component) capacitor 101 to a junction of a diode 102 and a diode 103. Diode 102 is connected in a manner to offer a low impedance to ground 99, for positive-going signals, through a potentiometer 104 and a resistor 105, and offers a high impedance to negative-going signals. Diode 103 is connected in a manner to offer a high impedance to positive-going signals and a low impedance to negative-going signals. Consequently, demodulation of the composite waveform occurs at the junction of diodes 102 and 103 with a resultant pulsating D.C. voltage in the negative direction appearing at the junction of a resistor 106, a capacitor 107 and a resistor 107*a*. This combination, with the addition of a capacitor 108, forms an RC filter network which provides a negative D.C. voltage at one end of a potentiometer 117. The amplitude of this D.C. voltage is directly proportional to, and varies as, the modulation component of the composite waveform appearing at plate 138*b* of IF tube 138**.

As shown in FIGURE 2, the arm or tap of potentiometer 117 is connected directly to the receiver automatic volume control (AVC) bus line 134 through isolating resistor 118 and switch 126 (normally closed for filter operation), and thence to control grid **136*a* through grid resistor 129. Control grid 138*a* is likewise connected to the arm of potentiometer 117 through grid resistor 138*c*, filter switch 126 and isolating resistor 118. The AVC bus 134 is returned to ground 99 through resistor 135. The AVC bus switch 128 is provided and is normally open for filter operation and optionally may be ganged with filter switch 126**.

At this point, there exists a negative D.C. control grid bias voltage which cuts off RF amplifier tube 136 and IF tube 138 whenever amplitude modulation of the received transmitted ICW carrier wave occurs and the amplitude of the negative D.C. cut-off bias is proportional to the amplitude of the modulation component.

Common AVC and receiver circuit design allows a fast receiver cut off, but the recovery time is long, due to the time constant employed. The discharge rate of a capacitor is essentially exponential and therefore, is fast over the first 80 percent of the discharge cycle $1/\epsilon$ or 0.368), and proportional to circuit resistance. The remainder of the discharge cycle is too long for rapid recovery of the receiver. These normal time constants would prevent operation of the receiver during modulation pulses of a fast repetition rate. To overcome this characteristic, the following circuit is employed.

As the capacitor discharge cycle decays to approximately the value of $1/\epsilon$ or 0.368, control grid **136*a* and control grid 138*a* cut-off bias voltage is reduced to a value which permits tubes 136 and 138 to start conducting when a short time period, low level unmodulated carrier signal, appears at control grid 136*a***. The noise (or modulated pulse) pulse repetition rate can be much faster, and the "off" time between pulses much shorter, due to the fact that the tubes start conducting at approximately time$=1/\epsilon$. The amplitude level of this signal, at this time, is not of a level sufficient to present a usable receiver output.

When this signal appears at the control grid **139*a* of a second IF tube 139, it is beat against an output of BFO tube 143** ($\pm$ 2500 c.p.s. of the IF center frequency), preferably the lower frequency having a waveform as indicated at *7e*, causing an amplified output at plate **139*b*** which is similar to the waveform illustrated in FIGURE *7h*. The amplitude indicated at A corresponds to the noise derived modulation and the amplitude indicated at B corresponds to the BFO derived modulation. This signal is inductively coupled to the control grid **140*a* of a first audio amplifier tube 140. Amplification of the signal thus occurs and appears at plate 140*b* of tube 140**. The obviously over-modulated carrier signal (*7h*) is a result of the relatively high level BFO output (indicated at *7e*) modulating the low level IF signal. Due to the fact that an amplitude modulation detector circuit responds to the composite modulation envelope, whether it have an amplitude as shown at *7g* or *7h* rather than to the individual signal components, a relatively large signal amplitude is available at plate **140*b***, and appears as shown in FIGURE *7f*.

At a normal receiver detector 130, demodulation of the IF output is accomplished and consequently a negative-going signal only occurs at the first audio grid **140*a*. Normal inversion occurs within tube 140 and a positive-going signal is available at plate 140*b*. This signal is capacitively coupled through capacitor 131 to the control grid of the second audio amplifier tube 141, and appears in normal form at plate 141*b***. Receiver performance is conventional from this point through an output.

Returning to the first audio amplifier plate **140*b*, a portion of the positive-going signal is also coupled through capacitor 113 to the junction of diodes 111 and 112. Diode 111 is connected in a manner to offer a high impedance to positive-going signals and a low impedance to negative-going signals. Diode 112** is connected in a manner to offer a low impedance to positive-going signals and a high impedance to negative-going signals.

Consequently, demodulation of the waveform occurs and a pulsating D.C. positive-going signal is present at the junction of a resistor 114, a resistor **115*a* and a capacitor 115. This RC network, with the addition of a capacitor 116, filters and smooths the pulsating D.C. voltage, and there appears at the lower end of potentiometer 117 a positive D.C. voltage that is relatively stable and does not vary as does the negative voltage at the opposite end of potentiometer 117**.

As indicated hereinbefore, an amplitude modulation detector circuit responds to the composite modulation envelope rather than to the individual signal components. In other words, the negative D.C. voltage appearing at the top of potentiometer 117 is proportional to, and varies as, the modulation component of the composite signal at the receiver input 100. The positive D.C. voltage appearing at the bottom of potentiometer 117 is a result of the BFO 143 output (a large signal), with a resultant fixed output when related to the varying composite signal arriving at the input 100. Potentiometer 117 comprises a summing network which functions as a comparator, or mixing device, and at the arm of potentiometer 117 there appears a fluctuating D.C. bias voltage which is connected to the AVC bus 134 as previously mentioned. A diode 119 and a resistor 120 are connected to the arm in a manner to prevent the AVC bias voltage from going positive and allowing tubes 136 and 138 to draw grid current. Potentiometer 117 also functions as a voltage level set to render the noise filter circuit output bias voltage compatible with all receiver tube operating points. Terminals 121 and 122 are connected to suitable bias voltage sources to provide back bias for proper operation of diodes 102, 103, 111 and 112 as described.

FIGURES 3 and 4 illustrate a schematic diagram of a circuit employed to render the circuit of FIGURE 2 usable for voice modulation reception. As illustrated in FIGURE 3, a capacitor 149 and a series switch 148 are connected in shunt across the BFO inductance 133. This circuit serves to limit the low-end frequency range of the difference frequency, created by beating the BFO 142 output with the second IF 139 output to a difference frequency of more than 2500 c.p.s., or higher than that required for voice moduation. The reason for limiting the low end of the BFO–IF combined output to a lower limit of 2500 c.p.s. is to prevent this signal from passing through a low-pass filter, which will be described in connection with FIGURE 4, and being heard or displayed in the receiver output. Any combined BFO–IF resultant output of more than 2500 c.p.s. will be attenuated by the low-pass filter, but will still be available for coupling into the noise filter from plate **140*b*. The switches 148 and 150** may be ganged if desired.

FIGURE 4 illustrates a constant "K" low-pass filter of the type which may be employed in reception of voice modulated signals. The low-pass filter is inserted in the circuit of FIGURE 2 between grid coupling capacitor 131 and grid resistor 132 and is connected directly to grid **131*a*. In the voice communications position, switch 150 of FIGURE 4 connects the signal through the low-pass filter. In the CW or ICW position, switch 150 bypasses the signal around the low-pass filter directly to control grid 131*a* of tube 131**. It is to noted that, in the voice communications mode, the radio receiver is fully capable of normal reception and use of the receiver output, of all radio signals containing any modulation in or modulated pulse component from D.C. to 2500 c.p.s.

FIGURE 5 illustrates a block and signal flow diagram of the noise filter as applied to a typical automatic direction finder (ADF) radio receiver. This type of receiver is unique in that it presents a single receiver capable of being used in all modes and basic embodiments of the present invention. For example, this type of receiver is a *L/MF* receiver, capable of receiving voice modulation, *CW/ICW* unmodulated signals, and includes a self-contained BFO 142; the output is supplied to a loud speaker and/or displayed on an indicator 156, as desired. Observance of the FIGURE 5 diagram will indicate that the ADF receiver is basically similar to the receiver illustrated in FIGURES 1 and 2.

One interesting capability is presented in the case of the ADF receiver over the normal communications receiver in that the detector 130 output drives a loop drive amplifier 153 directly. When the receiver is cut off, due to noise modulation received at loop antenna 155 or sense antenna 160, then indicator 156 will remain fixed (or clamped) by inherent design characteristics until such time that a new signal input is received. Also, an ADF receiver functions by receiving radio bearing information from a CW or ICW radio carrier and any normal modulation of the carrier is for operator information only. As explained hereinbefore, operator information is completely covered by the scope of the invention. It is to be noted, that the noise filter 125 may be used with, and connected to the receiver of FIGURE 5 in much the same manner as described in connection with the receiver of FIGURE 2.

FIGURE 6 illustrates the application of the present noise filtering system as applied to radar receivers. The philosophy of the filter as applied to all types of radio frequency receivers has been covered hereinbefore. Radar receivers 161 and 162 may be any conventional and well-known construction for the reception of fixed frequency radar emission. Modulation of a transmitted carrier pulse by reflection, or by being beat by another radar transmitter pulse will cause an original pulse **161*a* to be modulated and cause a resultant signal 161*b*. Pulsed carrier signals received in the form represented at 161*b* or 162*b*, whether accidental or man-made, are filtered in the respective receivers 161 and 162 in a manner similar to that illustrated in FIGURES 1 and 2. Modulation or overmodulation, of the "blip," with its well-known deleterious effect on a cathode ray tube display, is thus prevented. Extraneous noise, illustrated by waveform 163**, will cause similar moduation of the carrier, whether accidental or man-made.

As shown in FIGURE 8, a cathode follower 170 may be installed if desired between the capacitor 101 and the plate **138*b* of the first IF tube 138. The cathode follower 170** is inserted between the IF stage and the noise filter primarily to reduce the capacitance which would otherwise be added to the primary of the IF transformer and to avoid reduction of the high frequency response of the IF stages.

It may thus be seen that an effective efficient and reliable noise filter apparatus has been provided that may be used in a variety of different communications systems of the type in which the intelligence and the carrier are combined and where it is desired to eliminate noise from the output of receivers. Obviously, the present filter may be used with receivers of various designs and may be incorporated either as original equipment or as an attachement to the receiver. Additionally, it is important to note that the filter of the present invention is operative over an extremely wide portion of the electromagnetic spectrum.

Having thus described the invention and several exemplary embodiments thereof, it is desired to emphasize the fact that many further modifications may be made by those skilled in the art in a manner limited only by a just interpretation of the following claims.

What is claimed is:

1. In an amplitude modulation communications system having an intermediate frequency stage and a demodulator connected thereto, modulation control apparatus comprising:

first detector means connected to said intermediate frequency stage to provide a first control signal having a given polarity, oscillator means connected directly to said intermediate frequency stage to provide a beat frequency signal at the output of said demodulator, second detector means connected to the output of said demodulator to provide a second control signal having a polarity opposite that of said first control signal, and network means summing said first and second control signals to provide an output signal to said intermediate frequency stage, whereby to control the transmission characteristics of said intermediate frequency stage.

2. Noise modulation control apparatus comprising:

converter means responsive to a transmitted carrier frequency to provide a heterodyned intermediate frequency signal, first detector means responsive to said intermediate frequency signal for providing a first unidirectional control signal proportional to amplitude modulation of said carrier, oscillator means for impressing a fixed frequency signal upon said intermediate frequency signal to provide a beat frequency signal, second detector means responsive to said beat frequency signal to provide a utilization output signal, third detector means responsive to said utilization output signal for providing a second control signal proportional to the amplitude of said beat frequency signal and having a polarity opposite to that of said first control signal, network means summing said first and second control signals to provide a cut-off signal, and means responsive to said cut-off signal to prevent the transmission of said carrier frequency through said apparatus whenever said cut-off signal reaches a given magnitude.

3. Noise modulation control apparatus as defined in claim 2 having a low-pass filter connected to said second detector means for selectively attenuating said utilization output signal; the frequency of said fixed frequency signal being greater than the cut-off frequency of said filter.

4. In a receiver adapted for reception of signals having a noise component, said receiver having an intermediate frequency amplification stage, a detector stage, a detector output amplification stage and amplification control means, the combination with said receiver of a noise filter comprising:

a fixed frequency oscillator coupled to said intermediate frequency amplification stage for providing a fixed frequency signal, first rectifier means coupled to said intermediate frequency amplification stage at a point therein preceding said fixed frequency oscillator for providing a negative direct current voltage that is directly proportional to said signal and noise component, second rectifier means coupled to said detector output amplification stage for providing a positive direct current voltage representative of the resultant combination of said signal and noise component and said fixed frequency signal, and comparator means coupled to said first and second rectifier means for comparing said negative and positive direct current voltages, an output from said comparator means being coupled to said amplification control means, whereby to control said amplification control means substantially to eliminate said noise component.

5. A noise filter arrangement according to claim 4 where said first and second rectified means each comprise a pair of oppositely polarized rectifiers to provide said positive and negative voltages.

6. A noise filter arrangement according to claim 4 wherein said comparator comprises:

a fixed impedance having a tap positioned remote from the ends thereof, one of said ends being coupled to said negative D.C. voltage derived from said first rectifier means, the other of said ends being coupled to said positive D.C. voltage derived from said second rectifier means and said tap being coupled to said amplification control means.

7. A noise filter arrangement according to claim 6 wherein said fixed impedance comprises:

a potentiometer having a movable tap.

8. In a receiver adapted for reception of signals having a noise component, said receiver having an intermediate frequency amplification stage, a detector stage, a detector output amplification stage, amplification control means and a fixed frequency oscillator coupled to said intermediate frequency amplification stage, the combination with said receiver of a noise filter comprising:

first rectifier means coupled to said intermediate frequency amplification stage at a point therein preceding said fixed frequency oscillator for providing a negative D.C. voltage that is directly proportional to said signal and noise component, second rectifier means coupled to said detector output amplification stage for providing a positive D.C. voltage representative of the resultant combination of said signal and noise component and said fixed frequency signal, and comparator means coupled to said first and second rectifier means for comparing said negative and positive D.C. voltages, an output from said comparator means being coupled to said amplification control means, whereby to control said amplification control means substantially to eliminate said noise component.

9. In a receiver adapted for reception of signals having a noise component, said receiver having an intermediate frequency amplification stage, a detector stage, a detector output amplification stage and amplification control means, the combination with said receiver of a noise filter comprising:

a fixed frequency oscillator coupled to said intermediate frequency amplification stage for providing a fixed frequency signal, first rectifier means coupled to said intermediate frequency amplification stage at a point therein preceding said fixed frequency oscillator for providing a negative D.C. voltage that is directly proportional to said signal and noise component, second rectifier means coupled to said detector output amplification stage for providing a positive D.C. voltage representative of the resultant combination of said signal and noise component and said fixed frequency signal, comparator means coupled to said first and second rectifier means for comparing said negative and positive D.C. voltages, an output from said comparator means being coupled to said amplification control means, whereby to control said amplification control means substantially to eliminate said noise component, and first and second filter means coupled respectively between said first and second rectifier means of said comparator means.

10. In a receiver adapted for reception of signals having a noise component, said receiver having an intermediate frequency amplification stage, a detector stage, a detector output amplification stage amplification control means and a fixed frequency oscillator coupled to said intermediate frequency amplification stage, the combination with said receiver of a noise filter comprising:

first rectifier means coupled to said intermediate frequency amplification stage at a point therein preceding said fixed frequency oscillator for providing a negative D.C. voltage that is directly proportional to said signal and noise component, second rectifier means coupled to said detector output amplification stage for providing a positive D.C. voltage representative of the resultant combination of said signal and noise component and said fixed frequency signal, comparator means coupled to said first and second rectifier means for comparing said negative and positive D.C. voltages, an output from said comparator means being coupled to said amplification control means, whereby to control said amplification control means substantially to eliminate said noise component, and first and second filter means coupled respectively between siad first and second rectifier means and said comparator means.

11. A noise filter arrangement according to claim 10 wherein said first and second rectifier means each comprise a pair of oppositely polarized rectifiers to provide said positive and negative voltages and said comparator comprises a potentiometer having a movable tap output coupled to said amplification control means.

12. In a receiver adapted for reception of combined signals and undesired noise components, said receiver comprising amplification stages for amplifying said signals and noise components:

a comparator coupled to selected different ones of said amplifier stages and having an output, a fixed frequency oscillator providing a fixed frequency signal and coupled to one of said receiver amplifier stages intermediate said different ones of said amplifier stages, said comparator output representing a comparison of said signals and said noise components and a combination of said signals and noise components and said fixed frequency signal, and means coupled to said receiver for controlling amplification of said receiver amplifier stages in accordance with said output of said comparator.

13. In a receiver adapted for reception of combined signals and undesired noise components, said receiver comprising amplification stages for amplifying said signals and noise components:

a comparator coupled to selected different ones of said amplifier stages, said comparator comprising a potentiometer having an output in the form of a movable tap thereon, a fixed frequency oscillator providing a fixed frequency signal and coupled to one of said receiver amplifier stages intermediate said different ones of said amplifier stages, said comparator output representing a comparison of said signals and said noise components and a combination of said signals and noise components and said fixed frequency signal, and means coupled to said receiver for controlling amplification of said receiver amplifier stages in accordance with said output of said comparator.

14. In a receiver adapted for reception of signals having a noise component, said receiver having an intermediate frequency amplification stage, a detector stage, a detector output amplification stage and amplification control means, the combination with said receiver of a noise filter comprising:

a comparator coupled to selected different ones of said amplifier stages and having an output, a fixed frequency oscillator providing a fixed frequency signal and coupled to one of said receiver amplifier stages intermediate said different ones of said amplifier stages, said comparator output representing a comparison of said signals and said noise components and a combination of said signals and noise components and said fixed frequency signal, and means for controlling amplification of said receiver amplifier stages in accordance with an output from said comparator.

15. In an information transmission system in which information signals and undesirable noise are impressed on a carrier:

means for producing a first control signal, of a first polarity, proportional to the signal and noise amplitude of the carrier;

means for impressing a fixed amplitude signal on said carrier;

means for producing a second control signal, of opposite polarity to said first control signal, proportional to the amplitude of the combined signal resulting from the impression of said fixed amplitude signal on the signal and noise amplitude of said carrier;

means for summing said first and second control signals to produce an output signal; and gating means responsive to said output signal for controlling the transmission of said carrier at a location in said system ahead of said fixed signal impressing means, thereby controlling the transmission characteristics of said system by suppressing noise on said carrier.

References Cited by the Examiner

UNITED STATES PATENTS 3,036,211 5/1962 Broadhead et al. ----- 325—404

KATHLEEN H. CLAFFY, *Primary Examiner.*

DAVID G. REDINBAUGH, ROBERT H. ROSE, *Examiners.*

J. P. MOHN, R. S. BELL, *Assistant Examiners.*